(12) United States Patent  
Vadde (10) Patent No.: US 7,173,961 B2  
(45) Date of Patent: *Feb. 6, 2007

(54) FREQUENCY DOMAIN PARTIAL RESPONSE SIGNALING WITH HIGH SPECTRAL EFFICIENCY AND LOW PEAK TO AVERAGE POWER RATIO

(75) Inventor: Venkatesh Vadde, Irving, TX (US)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/793,017

(22) Filed: Mar. 3, 2004

(65) Prior Publication Data

US 2004/0170228 A1    Sep. 2, 2004

Related U.S. Application Data

(63) Continuation-in-part of application No. 09/808,564, filed on Mar. 14, 2001, now Pat. No. 7,003,025, which is a continuation-in-part of application No. 09/704,086, filed on Nov. 1, 2000, now Pat. No. 6,999,503.

(60) Provisional application No. 60/229,571, filed on Aug. 31, 2000.

(51) Int. Cl.
*H04B 1/38* (2006.01)
*H04L 27/28* (2006.01)

(52) U.S. Cl. .................. 375/219; 375/260; 375/263

(58) Field of Classification Search ................ 375/219, 375/222, 232, 263, 262, 265, 377, 260; 370/208, 370/210; 708/404, 405

See application file for complete search history.

(56) References Cited

U.S. PATENT DOCUMENTS

| 5,675,611 A | 10/1997 | Lehtinen et al. ............ 375/297 |
| 5,787,113 A * | 7/1998 | Chow et al. ................ 375/219 |
| 6,157,593 A | 12/2000 | Costa et al. ................ 367/137 |
| 6,175,551 B1 * | 1/2001 | Awater et al. ............. 370/210 |
| 6,563,841 B1 * | 5/2003 | Nedic et al. ................ 370/480 |
| 6,631,175 B2 * | 10/2003 | Harikumar et al. ......... 375/350 |
| 6,657,950 B1 * | 12/2003 | Jones et al. ................ 370/208 |

OTHER PUBLICATIONS

Vadde, Venkatesh, "PAPR Reduction by Envelope Stabiliazation with Partial Response Signalling in OFDM Systems", 2001 IEEE Radio And Wireless Conference, Aug. 10-11, 2001, pp. 197-201.

Kabal, Peter, et al., "Partial-Response Signaling", IEEE Transactions On Communications, vol. Com-23, No. 9, Sep. 1975, pp. 921-934.

Zhao, Y. et al., "Intercarrier Interference Compression in OFDM Communication Systems by Using Correlative Coding", Aug. 1998, IEEE Communications Letters, vol. 2, No. 8, pp. 214-216.

Zhao, Y., "In-Band and Out-Band Spectrum Analysis of OFDM Communication Systems using ICI Cancellation Methods", HTML version, Aug. 21-25, 2000, Proceedings of 16th International Conference on Communication Technology, vol. 1, 6 pgs.

* cited by examiner

*Primary Examiner*—Young T. Tse  
(74) *Attorney, Agent, or Firm*—Harrington & Smith, LLP (57) ABSTRACT

The system includes a transmitter for generating a signal in the time domain and transforming the signal to the frequency domain, wherein the transmitter suppresses a plurality of sub-carriers of the signal, The resulting truncated signal is transmitted to the receiver through a noisy channel. The receiver receives a noisy signal and recovers the carrier signal and, hence, the partial response signal from the noisy signal. The method includes selecting a cyclic convolver having predefined values, applying the cyclic convolver to a signal to produce a partial response signal, dropping a plurality of sub-carriers of the partial response signal, to generate a modulated carrier signal that is ready for transmission.

19 Claims, 9 Drawing Sheets

$$X[n] = \frac{1}{\sqrt{N}} \sum_{k=0}^{N-1} x[k] \exp\left(\frac{-j2pkn}{N}\right), n=0,\ldots N-1 \quad (1)$$

$$\gamma(d) = \frac{E\{x_{rd}^2\}}{E\{x_{tx}^2\} + E\{x_{rd}^2\}} \quad (2)$$

$$c_N(k) = (-1)^k \frac{M!}{(M-k)!\, k!} \quad (3)$$

$$\gamma(d) = \frac{[2 \sum_{k=0}^{d/2-1} e_N[k]^2]}{[\sum_{k=0}^{N-1} e_N[k]^2]} \quad (4)$$

$$f\psi_{max}(\psi) = \frac{1}{\sigma^2} \exp(-\psi/\sigma^2) u(\psi) \quad (5)$$

$$f\psi_{max}(\psi) = \frac{N}{\sigma^2} e^{-\psi/\sigma^2} (1 - e^{-\psi/\sigma^2})^{N-1} u(\psi) \quad (6)$$

$$\hat{c}_N = \frac{c_N(k)}{\sqrt{\sum_{m=0}^{M} c_N^2[m]}} \quad (7)$$

$$|x|_{peak} = \sum_{k=0}^{M} |\hat{c}_N(k)| \quad (8)$$

$$P_{peak} = \frac{2^{2M}}{\sum_{k=0}^{M} |c_N[k]|^2} \quad (9)$$

FIG.9

FREQUENCY DOMAIN PARTIAL RESPONSE SIGNALING WITH HIGH SPECTRAL EFFICIENCY AND LOW PEAK TO AVERAGE POWER RATIO

CROSS REFERENCE TO RELATED APPLICATIONS

This application is a continuation-in-part to United States Patent Application Publication US 2002/0075840 A1, filed on Mar. 14, 2001, patent application Ser. No. 09/808,564, now U.S. Pat. No. 7,003,025 entitled Envelope Stabilization Method and Apparatus, which is a continuation-in-part to U.S. patent application Ser. No. 09/704,086, filed on Nov. 1, 2000 and issued Feb. 14, 2006 as U.S. Pat. No. 6,999,503, entitled PARTIAL RESPONSE SIGNALING FOR ORTHOGONAL FREQUENCY DIVISION MULTIPLEXING claiming the benefit of U.S. Provisional Application No. 60/229,571, filed Aug. 31, 2000. All of the above applications assigned to the assignee of the present application and all are incorporated by reference.

Priority is claimed based on U.S. Provisional Application 60/454,590, filed on Mar. 17, 2003.

BACKGROUND

This invention relates to communication systems and, more specifically, to modulation techniques for communication systems.

Typical communication systems transmit information from one location or source to a second location or destination. The information travels from the source to the destination through a channel; this channel is typically a noisy channel. Thus, the channel introduces various forms of noise. The term "noise" is used herein to define various forms of signal corruption, such as interference, fading, attenuation, environmental impact, and electronic noise, that alter the characteristics of a signal as it travels through a channel. Accordingly, the signal that is transmitted through the channel and received at a receiver is a combination of the transmitted signal and the effects of noise introduced by the channel as a result of travelling through the channel.

In a cellular communications system, one type of noise is called "interference". More specifically, there are at least two forms of interference in communication systems: co-channel interference (CCI) and inter-symbol interference (ISI). CCI arises in communication systems due in part to the fact that there are several transmitters in communication with the same receiving unit. The signal from one transmitter can interfere with the signal from another transmitter. For example, in a cellular communication system there are several mobile stations in communication with the same base station which often leads to CCI. Each transmitter is an omni-directional transmitter. However, a signal being transmitted from one transmitter can take several paths as the signal travels from the transmitter to the receiver. This leads to ISI, a form of self interference.

As indicated above, in a communication system information is transmitted through the channel from the source to the destination. The information is carried by a carrier signal that is modulated to contain or carry the information. Various forms of modulation are used for transmission of the information through the channel. Modulation is the process of varying the characteristic of a carrier according to an established standard or scheme; the carrier is prepared or "modulated" by the information to produce a "modulated" carrier signal that is transmitted by the source to the destination through the channel. For example, in a cellular communication system, modulation is the process of varying the characteristics of the electrical carrier as information is being transmitted. The most common types of modulation are Frequency Modulation (FM), Amplitude Modulation (AM), and Phase Modulation (PM).

One modulation technique currently used in the industry is called Orthogonal Frequency Division Multiplexing (OFDM). OFDM is one of the techniques for multicarrier modulation. Multicarrier modulation is a technique for modulating multiple carriers with different information, all of which are transmitted simultaneously or parallel in time. OFDM has high spectral efficiency as well as tolerance to multipath fading. As indicated above, transmitters are omni-directional and transmit in all directions. Thus, a signal emerging from a transmitter, or the source, can travel multiple paths to reach the receiver, or the destination. Accordingly, multipath fading occurs on a carrier signal's intensity, which results in alteration of the information being carried.

Typically, the information bearing signal itself is referred to as the baseband signal, when it is transmitted without a carrier. Sometimes the baseband signal has to be embedded in a high frequency carrier and communicated. Then, the high frequency carrier signal that delivers the information bearing (baseband) signal through suitable modulation is usually referred to as the passband signal.

The efficiency of a system utilizing OFDM stems from the simultaneous or parallel transmission of several subcarriers in time. While this lowers the bit-rate on each of the subcarriers, it provides an "N"-fold increase in aggregate bit-rate, wherein "N" is the number of subcarriers. Additionally, because the low bit-rate signals hardly suffer any ISI and the subcarriers are orthogonal, it is possible to demodulate the subcarriers independent of each other. A conventional OFDM system comprises a set of sub-symbols X[k] transmitted in time using an Inverse Fast Fourier Transform (IFFT). The time-domain baseband signal can be represented as:

$$x[n] = \frac{1}{\sqrt{N}} \sum_{k=0}^{N-1} X[k] \cdot \exp\left(\frac{j2\pi kn}{N}\right), n = 0, 1 \ldots N-1$$

Thus, the N-sample long transmitted OFDM symbol vector can be expressed as:

$$x_N = IFFT\{X_N\}$$

where, $x_N$ and $X_N$ are the time and frequency domain symbol vectors, respectively.

In a typical OFDM system, binary symbols or bit streams are encoded in the form of complex valued numbers. The complex valued numbers are drawn from an M-ary alphabet. The complex valued numbers are then used to modulate a set of orthogonal sub-carriers to generate a time-domain signal using an Inverse Discrete Fourier Transform (IDFT). The resulting baseband signal, which is usually complex valued, is quadrature modulated on a Radio Frequency (RF) carrier and transmitted through an air interface channel. The transmitted signal is corrupted by channel noise and dispersion before being received.

There are several problems associated with systems that utilize OFDM modulation techniques. For example, the channel is subject to fading due to multipath and path loss. Additionally, the channel suffers from ISI which poses a problem at the receiver when data has to be detected. Furthermore, manufacturers of devices that transmit and receive data are always faced with the challenge of increasing the amount of and the rate at which information can be transmitted over a finite bandwidth while overcoming signal loss due to channel noise.

One of the persistent problems with OFDM systems is a high peak to average power ratio (PAR or PAPR). The PAR is a measure of the peak power that occurs in the time domain OFDM signal relative to the average power transmitted. A high PAR is usually difficult to handle and involves undesirable power-throughput tradeoffs due to imperfect RF power amplifiers (RFPA). The RFPA's have to operate in output back-off modes, leading to lower output power and reduced throughput or capacity. What is more, operating an RFPA in back-off modes leads to very low power efficiencies, and excessive heating in transmitters.

The most common method to reduce system PAPR is by clipping the signal whenever the envelope amplitude exceeds the clipping threshold. The problem with this technique is two fold. First, the signal fidelity is lowered because of signal energy that has been discarded by clipping the peak-valued signal samples. Second, any clipping action is an amplitude compression scheme leading to a bandwidth expansion (however subtle) in the frequency domain. Furthermore, the effectiveness of clipping decreases as we employ higher orders of modulation such as 16-QAM or 64-QAM.

Companding is another method that yields impressive PAPR alleviation. The bandwidth expansion associated with these methods is however significantly higher than clipping. Also, such methods do not lend themselves very well to implementation in multipath channels. Coding methods have also been tried in the past to reduce PAPR. The tradeoff is however again in a reduced effective code-rate of the system, which is again a price paid in bandwidth.

Therefore, there is a great incentive to reduce the OFDM PAR as it can lead to system wide throughput & power efficiency gains. What is needed is a system and method for minimizing signal PAR, the impact of ISI and fading on OFDM systems, as well as enhancing the bit-rate or spectral efficiency.

SUMMARY

A system and method are provided that perform partial response signaling with an OFDM system, wherein the signal compression through partial response signaling is accomplished in frequency domain.

An aspect of the invention is the cyclic convolution of a stream of data samples in the time domain, followed by a transformation to the frequency domain, with subcarriers in the frequency domain that have low energy being dropped before transmission.

Another aspect of the invention is the selection of a convolution polynomial that concentrates energy in a reduced portion of the spectral envelope, so that a portion of the partial response signal in the frequency domain has near zero amplitude.

Another aspect of the invention is dropping the portion of the partial response signal with near zero magnitude in frequency domain from the partial response signal to produce a truncated partial response signal.

Another aspect of the invention is a reduction in the peak to average power ratio encountered by the RFPA in the time domain.

Yet another aspect of the invention is the use of less expensive power amplifiers permitted by the reduction in peak to average power ratio.

Yet another aspect of the invention is the simultaneous reduction in bandwidth and in the peak to average power ratio which is encountered in the time domain.

DETAILED DESCRIPTION

Figure 1:
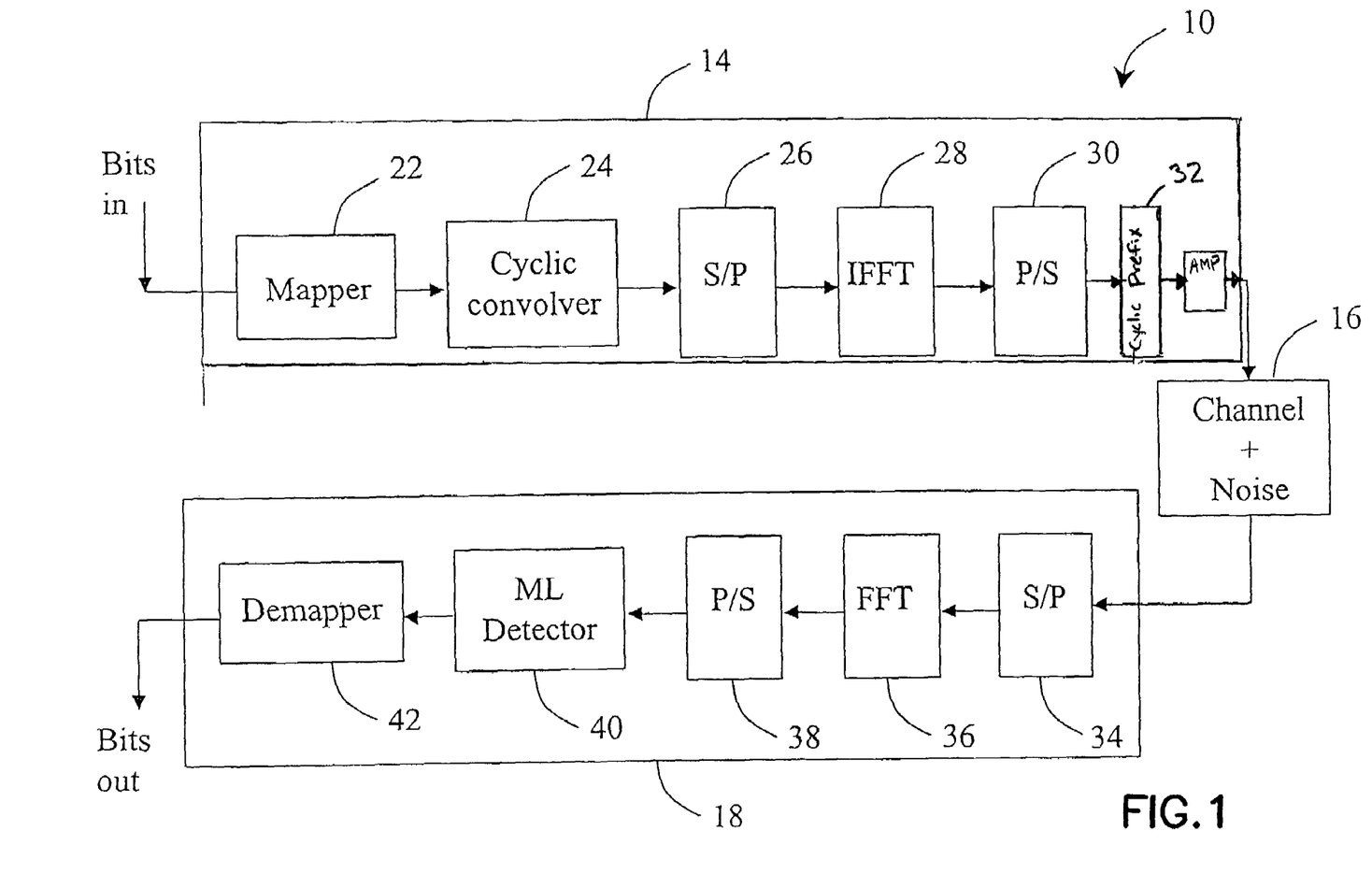
FIG. 1 is a block diagram illustration of a system with a time-domain partial response technique of Orthogonal Frequency Division Multiplexing (OFDM).

Referring now to FIG. 1, a communication system 10 is shown having a transmitter 14, a channel 16, and a receiver 18, wherein the system 10 utilizes a time-domain Partial Response (TDPR)-Orthogonal Frequency Division Multiplexing (OFDM) signal modulation technique. The transmitter 14 includes a mapper 22, a cyclic convolver 24, a serial-to-parallel converter unit 26, an Inverse Fast Fourier Transform (IFFT) unit 28, a parallel-to-serial converter unit 30, and prefix unit 32. The transmitter 14 transmits the information to the receiver 18 through the channel 16. The channel 16 is a noisy channel. The receiver 18 includes a serial-to-parallel converter unit 34, a Fast Fourier Transform (FFT) unit 36, a parallel-to-serial converter unit 38, a Maximum Likelihood (ML) estimator unit 40, and a demapper unit 42.

Information in the form of binary signals are received at the transmitter 14 and inputted to the mapper 22 for mapping to or encoding in the form of a set of complex numbers drawn from an M-ary alphabet to produce a complex signal, which is then used to modulate or prepare a carrier signal for transmission as discussed in detail below. The transmitter 14 transmits the carrier signal through the channel 16 to the receiver 18. As the carrier signal, which is a time based signal, travels through the channel 16, the channel 16 introduces noise to the carrier signal, such as x[n], corresponding to a channel impulse response, such as h[n], of the channel 16. The cyclic convolver unit 24 performs a cyclic convolution on the complex signal. Additionally a prefix unit appends a cyclic prefix (CP) at the leading edge or the beginning of the complex signal that also helps compensate for the effects of the channel 16 and helps suppress Inter-Symbol Interference (ISI) in each of the low bit-rate sub-channels of the TDPR-OFDM signal.

The CP ensures that when the channel 16 performs a convolution on each OFDM time-symbol the effect of the channel 16 can be eliminated at the receiver 18. In a partial response (PR) technique, in accordance with the teaching of the present invention, inter-subcarrier (i.e., inter-channel) interference (ICI) is generated and introduced in the frequency domain signal so as to shorten the effective time-domain symbol. The generated ICI is introduced to the complex signal by the cyclic convolver unit 24, as indicated above. The cyclic convolver unit 24 introduces, based on the desired or generated ICI, systematic or known amounts of dispersion to produce a partial response signal. In the system 10, the frequency symbol $X_N$ is subjected to a cyclic convolution by a known polynomial $c_N$ of order M, which is defined as follows:

$$c_N = [c(0) c(1) \ldots c(M-1) 0\ 0 \ldots 0]$$

The PR polynomial can be expressed as a zero-padded vector of length N with M non-zero terms. The resulting time-domain symbol vector can now be expressed as follows:

$$x_N = \text{IFFT}\{X_N \otimes c_N\}$$

where, $\otimes$ denotes cyclic convolution performed by the cyclic convolution unit 24, which disperses the information in each frequency-domain sub-symbol over M successive sub-carriers. Accordingly, the receiver 18 requires a sequence-detection mechanism to unravel the input sub-symbols $X_N$, and this is performed by the ML detector unit 40. Additionally, the other outcome of the cyclic convolution with $c_N$ is that the original time vector-symbol $x_N$ now bears an amplitude envelope given by the following:

$$e_N = \text{IFFT}\{c_N\}$$

By appropriately choosing the polynomial vector $c_N$, the transmitter 14 can effectively suppress energy in parts of the OFDM time symbol-vector, thereby producing a TDPR-OFDM symbol. For example, consider the set of polynomials obtained from the coefficients of powers of r in p(r), where:

$$p(r) = (1-r)^m, m=1,2,\ldots$$

The envelope vector resulting from such a polynomial has a null at each of its extremities. Consequently, the energy at the extremities or the tails of the envelope of the time-domain symbol vector is effectively suppressed and can be dropped. Thus, the cyclic convolver unit 24 generates a partial response signal with near zero energy at the extremities in the time domain.

The most common method to reduce system PAPR is by clipping the signal whenever the envelope amplitude exceeds the clipping threshold. The problem with this technique is two fold. First, the signal fidelity is lowered because of signal energy that has been discarded by clipping the peak-valued signal samples. Second, any clipping action is an amplitude compression scheme leading to a bandwidth expansion (however subtle) in the frequency domain. Furthermore, the effectiveness of clipping decreases as we employ higher orders of modulation such as 16-QAM or 64-QAM.

Companding is another method that yields impressive PAPR alleviation. The bandwidth expansion associated with these methods is however significantly higher than clipping. Also, such methods do not lend themselves very well to implementation in multipath channels. Coding methods have also been tried in the past to reduce PAPR. The tradeoff is however again in a reduced effective code-rate of the system, which is again a price paid in bandwidth. The partial response signal, which is a frequency domain based signal, is then received by the serial-to-parallel unit 26. The serial-to-parallel unit 26 converts the partial response signal from serial to parallel signaling and passes the parallel partial response signal to the IFFT unit 28. The IFFT unit 28 performs a modulation that is a transformation on the parallel partial response signal to generate real and imaginary components in the time domain. The transformed parallel partial response signal is derived from the partial response signal. The real and imaginary components of the transformed parallel partial response signal are received by the parallel-to-serial unit 30, which coverts to serial signaling to produce a transformed partial response signal that is ready for transmission.

Figure 2A:
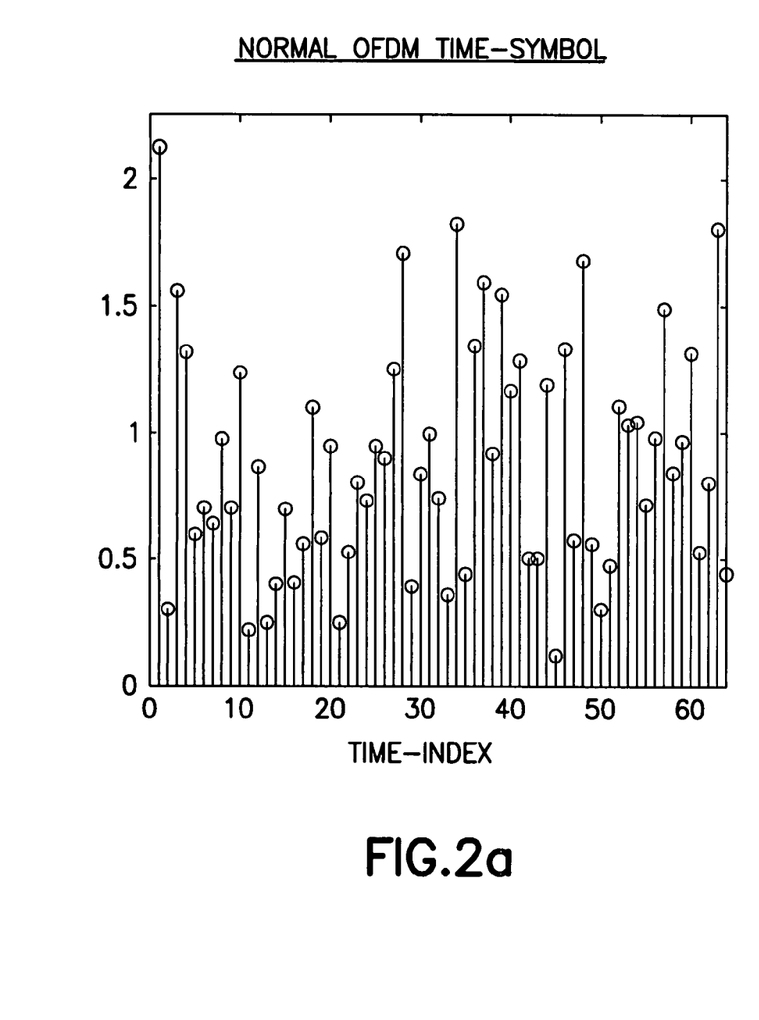
FIG. 2(a) is a graphical representation of an OFDM signal.
Figure 2B:
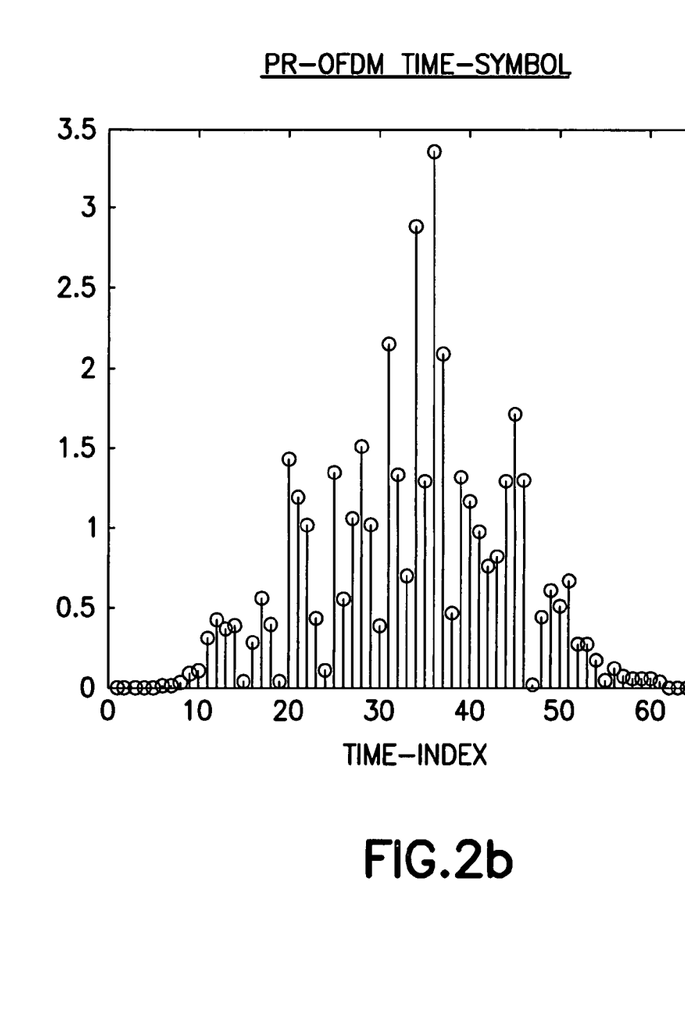
FIG. 2(b) is a graphical representation of a partial response OFDM signal altered by a preselected cyclic convolution polynomial.

Referring now to FIGS. 2(a) and 2(b), the effect of the partial response generating polynomial on the time-domain symbol vector is illustrated on a 64-sample time-symbol. Referring specifically to FIG. 2(a), a 64-sample time-symbol is shown in absolute value or magnitude only, which is drawn from a set of randomly picked Quadrature Phase Shift Keyed (QPSK) sub-symbols in the frequency domain. Although FIG. 2(a) illustrates QPSK sub-symbols, any constellation can be used for the partial response signal. In FIG. 2(b), the corresponding time-symbol magnitudes using a PR polynomial c of order M=2 is illustrated with several of the samples of the time-symbol suppressed near the ends. Dropping the samples near the ends results in virtually no performance loss because the energy at the tails of this time-symbol is very low. The label "dropping" is used herein to mean that the sub-symbols are not transmitted as part of the transmitted partial response signal. Accordingly, dropping or not transmitting the low-energy samples essentially enables compression of the signal in time, thereby achieving significant time or bandwidth gains. Reducing the time taken to transmit an OFDM time-symbol because of the PR effects can be construed as leading to extra bandwidth.

In one embodiment, the system 10 is an OFDM system using 64 sub-carriers. The PR polynomial orders from M=1 to M=4 are utilized in the system 10. For M=1, 2, 3 and 4, d=12, 16, 24 and 32 samples, respectively, (i.e., 6, 8, 12, and 16 samples from each extremity) are dropped. Therefore, in the absence of any other performance loss in BER or SNR the fraction of time saved in communicating an OFDM time-symbol is d/N. Consequently, the time saved is 12/64, 16/64, 24/64 and 32/64 or 18.75%, 25%, 37.5% and 50% for M=1, 2, 3 and 4, respectively. Accordingly, the time saved can be used to transmit additional OFDM symbols and the corresponding bandwidth gain, which is measured as extra transmissions possible in a given amount of time, is 23%, 33%, 60% and 100%, for M=1, 2, 3 and 4, respectively.

As indicated, the bandwidth gain is achieved with minimum spectral expansion, which is discussed in detail below. It will be apparent to those skilled in the art that the OFDM signal $s_1(t)$ before insertion of the CP can be represented as follows:

$$s_1(t) = \sum_{k=-\infty}^{\infty} p_k\{t - kN\Delta T\}$$

where, N is the FFT-size, $\Delta T = T/N$, and $p_k(t)$ is the $k^{th}$ baseband OFDM symbol transmitted in [(k-1)T, kT].

The $n^{th}$ sample, $s_1[n]$, of the signal is equal to $p_k[m]$, the $m^{th}$ sample of the pulse $p_k(t)$, where n=(m+kN). In one embodiment of PR signaling, d sub-symbols, wherein d is even, at the extremities are dropped from each OFDM symbol because the magnitudes of the dropped sub-symbols are relatively insignificant; dropping the sub-symbols from the OFDM signal produces a TDPR-OFDM signal in the time domain. In an alternative embodiment of PR Signaling, the sub-symbols dropped can be in any part of the PR signal. The TDPR-OFDM time-based signal therefore comprises symbols with (N-d) samples each, where the $k^{th}$ symbol contains a subset of samples from $p_k(t)$, specifically, the $(d/2+1)^{th}$ to $(N-d/2)^{th}$ samples. The TDPR-OFDM signal $s_2(t)$ can be expressed in terms of the pulse-train $p_k(t)$ as follows:

$$s_2(t) = \sum_{k=-\infty}^{\infty} p'_k\{t - k(N-d)\Delta T\}$$

where, the pulses $p'_k(t)$ and $p_k(t)$ are related as, $$p'_k(t) = p_k\left\{t + \left(\frac{d}{2}+1\right)\Delta T\right\} \cdot rect\left\{\frac{t}{(N-d)\Delta T}\right\}$$

where, rect(t)=1 $\forall$ t $\in$[0,1], and 0 otherwise.

The power spectral density (PSD) of the pseudo random signal represented by equation (1) can be computed from the auto correlation function of $s_1(t)$. Clearly, the auto correlation of $s_1(t)$ is confined to the interval [−NΔT, NΔT]. This follows from the confinement in time of $p_k(t)$ itself to [0, NΔT], and from the fact that different OFDM symbols are zero-mean as well as uncorrelated. Auto correlation of $s_1(t)$ is the same as that of the ensemble of pulses $p_k(t)$ i.e., $R_s(t)=R_p(t)$. The pulses $p'_k(t)$ are derived from $p_k(t)$, thus, it follows that:

$$R_{p'}(t) = R_p(t) \cdot rect\left\{\frac{t}{2(N-d)\Delta T}\right\}$$

Thus, the PSD $S_{p'}(f)$ of the continuous-time TDPR-OFDM signal $s_2(t)$ is related to the PSD $S_p(f)$ of the regular OFDM signal $s_1(t)$ in equation (1) as follows:

$$\begin{aligned}S_{p'}(f) &= FT\{R_{p'}(t)\} \\ &= FT\left\{R_p(t) \cdot rect\left(\frac{t}{2(N-d)\Delta T}\right)\right\} \\ &= (2(N-d)\Delta T)S_p(f) * \text{sinc}(2(N-d)f\Delta T) \\ &\propto S_p(f) * \text{sinc}(2(N-d)f\Delta T)\end{aligned}$$

where, * denotes convolution. For M=4, the value of d≈N/2, implying the bandwidth increases by a factor sinc(fT). The impact of this factor, in the frequency domain, for the case M=4 and the choice d=N/2 is quite negligible compared to the large bandwidth gains possible through TDPR-OFDM.

The TDPR-OFDM signal has parts of the time-symbol suppressed. The cyclic convolution polynomial is selected so that the suppressed parts lie towards the extremities of the time-symbol, even though a polynomial could be selected to suppress any portion of the OFDM, such as the middle portion. In the present embodiment, the suppression occurs at the extremities of the time-symbol. With the extremities of the time domain symbol suppressed, a CP can be added without interference from the signal itself. The length of the CP to be appended is usually fixed as the maximum channel length, L, to be encountered. At the receiver 18, the CP bears all of the ISI and is simply dropped for detection purposes. Thus, an orthogonal choice of subcarriers with a CP provide a multicarrier technique free of ISI and inter-subcarrier (i.e., inter-channel) interference (ICI). The cyclic-prefix or CP by definition is chosen to be the last L samples of the symbol and is appended to the beginning. For TDPR-OFDM in our case, we will always use an order of PR polynomial such that the number of suppressed sub-symbols satisfies d/2>L. Thus, the CP will simply consist of L blank (i.e., all-zero) sub-symbols appended to the truncated symbol $p'_k[n]$. It is an added advantage therefore that the CP used in TDPR-OFDM can have little or no energy.

The partial response signal is transmitted through the channel 16 and received at the receiver 18 as a transmitted partial response signal. The transmitted partial response signal is received at the serial-to-parallel unit 34 and converted to a parallel transmitted partial response signal and passed to the FFT unit 36. The FFT unit 36 performs the inverse transformation of the transformation performed by the IFFT unit 28 and, hence, transforms the signal from a time domain based signal to a frequency domain based signal to produce a converted parallel transmitted partial response signal. The converted parallel transmitted partial response signal is passed to the parallel-to-serial unit 38. The parallel-to-serial unit 38 changes the converted parallel transmitted partial response signal to a converted transmitted partial response signal. The converted transmitted partial response signal is passed to a maximum likelihood (ML) detector unit 40. The ML unit 40 unravels the converted transmitted partial response signal to produce or recover the complex-number based signal. The demapper unit 42 converts the complex-number based signal into a binary stream that is outputted from the receiver.

Figure 3:
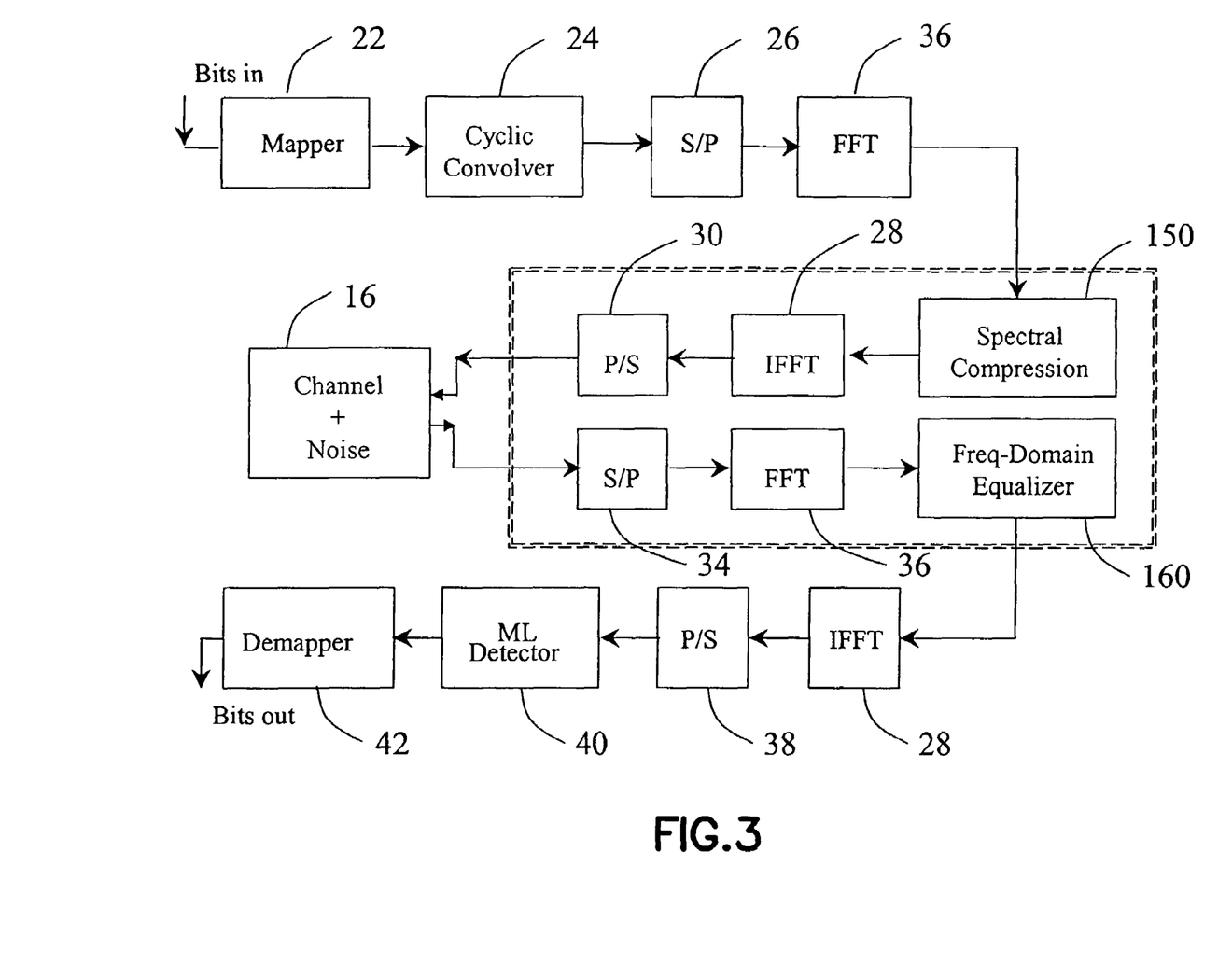
FIG. 3 is a block diagram of a system according to the present invention, namely, frequency domain partial response signaling for OFDM.

In a preferred embodiment of the invention, a novel technique to perform partial response signaling with an OFDM system is used that is based on correlative coding principles applied to an OFDM signal whose time and frequency signals are swapped. FIG. 3 shows a block diagram that outlines the steps involved, where blocks with the same number perform the same function as corresponding blocks in FIG. 1.

The time-domain signal entering on the left is convolved with a known polynomial. The effect of this convolution is to alter the signal spectrum in the frequency domain so as to localize energy in certain parts of the spectrum. This localization allows us to compress the effective system bandwidth in unit 150. As such, we are able to transmit more data using less bandwidth. An outcome of the cyclic convolution is that we use a sequence detector 40 at the receiver.

The convolved signal from convolver 24 undergoes a serial to parallel conversion in unit 26, where it is arranged in vectors that are operated on by FFT 36 that applies a Fourier Transform on the incoming vector.

As discussed above, the effect of the convolution is to suppress the amplitudes at the start and end of the F-T representation.

In the center of the Figure, box 150 applies spectral compression to the FD signal, after which inverse Fourier transform unit 28 performs an inverse Fourier transformation. Parallel to serial unit 30 passes the serial signal on to channel 16, where conventional units convert to RF frequency, amplify and transmit along the channel. Thus, the result of the 5 units 26, 36, 150, 28 and 30 is a serial signal in the time domain with a reduced bandwidth compared with the incoming signal entering convolver 24.

At the receiver, an inverse process is performed. The incoming serial signal is converted to parallel form by unit 34 and transformed to the frequency domain by unit 36. Equalizer 160 removes the noise and other adverse effects on the signal that result from its passage through the channel. Illustratively, the receiver estimates the effects of the channel by any convenient method, producing the data that the equalizer uses to clean up the signal.

The output from equalizer 160 is then converted back to the time domain in unit 28, converted back to serial format by unit 38 and detected in detector 40, illustratively a maximum-likelihood detector, that detects the signals and, in the process, undoes the "mixing" that was done in convolver 24. Demapper 42 converts the symbols that have been processed to a bit stream.

Preferably, the hardware at both ends of the transmission know which polynomial the convolver used in preparing the signal, e.g. by stepping through a list of polynomials in an agreed fashion. Alternatively, the transmitter 14 can periodically send a code to the receiver indicating which polynomial is used or the receiver can estimate which of a limited number of polynomials is in use.

Thus, a total of ten units (26, 36, 150, 28 and 30 in the transmitter and 34, 36, 160, 28 and 38 in the receiver) transform four times between the time and frequency domains in order to perform the spectral compression and the equalization.

At the same time, the frequency domain partial response (FDPR) signaling technique proposed here leads to a very orderly time-domain signal. In fact, one can exactly predict what amplitude levels the transmitted signal will have to nominally support. The signal will consist of a finite number of amplitude levels to start with. The peak amplitude in such a signal is well within the means of an RF power amplifier's linear transmission capabilities. These advantages with respect to PAPR arise directly from the structure of the PR technique proposed. Finally, the discrete amplitudes in the transmitted signal enable us to use more efficient power amplification methods than traditionally possible.

Preliminary simulations have shown that we can reduce the PAPR of the system by up to 8 dB. This advantage can be complemented with additional spectral gains. We show that the spectral footprint of the system can be decreased by over 50% using this method. BER simulations for uncoded data in AWGN channels revealed that usable performance can be expected at 15–17 dB. In 5-tap Rayleigh fading channels, we found that uncoded BERs of $3 \times 10^{-3}$ can be achieved at about 25–27 dB SNR.

This invention solves two related problems by simultaneously addressing the two problems without compromising one or the other. The problems addressed are those of a high PAPR in a multicarrier system as well as those of bandwidth expansion that often accompany PAPR reduction schemes. It is known that the peak to average problem in multicarrier systems is usually directly impacted by the bandwidth of the system. For instance, the PAPR in an OFDM system is proportional to the number of subcarriers, N. The larger the number of subcarriers N, for a given subcarrier spacing, the larger is the system bandwidth. Conversely, any technique to reduce PAPR is usually a tradeoff between bandwidth and PAPR improvement. For instance, even the simplest PAPR reduction technique, namely clipping, leads to a small but noticeable increase in bandwidth. Companding is an even clearer case where PAPR improvement comes at the expense of spectral expansion.

This invention provides for a frequency domain partial response signaling method that reduces system bandwidth while improving PAPR.

The most common method to reduce system PAPR is by clipping the signal whenever the envelope amplitude exceeds the clipping threshold. The problem with this technique is two fold. First, the signal fidelity is lowered because of signal energy that has been discarded by clipping the peak-valued signal samples. Second, any clipping action is an amplitude compression scheme leading to a bandwidth expansion (however subtle) in the frequency domain. Furthermore, the effectiveness of clipping decreases as we employ higher orders of modulation such as 16-QAM or 64-QAM.

Companding is another method that yields impressive PAPR alleviation. The bandwidth expansion associated with these methods is, however, significantly higher than clipping. Also, such methods do not lend themselves very well to implementation in multipath channels. Coding methods have also been tried in the past to reduce PAPR. The tradeoff is however in a reduced effective code-rate of the system, which is again a price paid in bandwidth.

The present invention improves on earlier solutions in the following ways:

Using the inventive method it is possible to simultaneously decrease PAPR and also the spectral width of the signal, which in turn leads to spectral efficiency gains. In comparison, prior methods to PAPR reduction have always been obtained at the expense of some bandwidth.

In comparison to the most popular method to handle PAPR (clipping), for FD-PR OFDM the loss of signal energy according to the invention is less. While the complexity of signal detection is higher here, we can hope to obtain better BER under higher SNR conditions.

In comparison to techniques like companding, this technique maintains or reduces signal bandwidth while providing PAPR improvement. Unlike companding, the invention can easily be used in frequency selective channels.

A disadvantage of this invention lies in the higher complexity of detection. But advances in VLSI and IC technology enable greater complexity to be handled each year.

An advantage of this method lies in its ability to combine the channel with the PR polynomial using a suitable equalizer. Thus, the task of equalization and detection can be accomplished in one shot by employing a sequence detector preceded by a prefilter.

FDPR signaling according to this invention comprises exchanging signal spaces (domains) and then making some systematic changes to time-domain samples. We refer to the block-diagram in FIG. 3, which shows a schematic signal flow diagram for the PR-OFDM system. The first modification made to a conventional OFDM system, as seen in FIG. 3, is a swapping of the signal spaces. This means that we start out in the time domain (instead of frequency) by mapping the input bits to sub-symbols x[k] chosen from a suitable constellation. The complex data points, X[n], modulating subcarriers in the frequency domain are then obtained using a Fast Fourier Transform (FFT) operation on x[k]. The frequency-domain baseband signal can thus be represented as Equation 1 in FIG. 9.

The OFDM time-symbol, $x_N$, which here is basically a vector of BPSK, QPSK or similar constellation points, is subjected to a cyclic convolution by a known polynomial. The resulting time-domain OFDM symbol can now be expressed as $$x'_N = x_N \otimes c_N$$

where, $\otimes$ denotes cyclic convolution. The result of such a cyclic convolution is two fold. First, it disperses the information in each time-domain sub-symbol over M successive time-samples. This spreading has the consequence that the detector 40 at the receiver end requires a sequence-detection mechanism to unravel the input sub-symbols x[k], k=0 - - - N-1.

The second outcome of the cyclic convolution with $c_N$ is that the signal spectrum $X_N$ now bears a time-averaged profile given by $$e_N = FFT\{c_N\}$$

Our motivation for employing the polynomial $c_N$ will become apparent when we examine this envelope closely. We have discovered that we can choose the polynomial $c_N$, such that we can localize energy in parts of the spectral envelope, $e_N$. As an example, suppose $c_N$ is made up of the coefficients of powers of r in p(r) where, $$p(r) = (1-r)^M, M=1,2,\ldots$$

Figure 4:
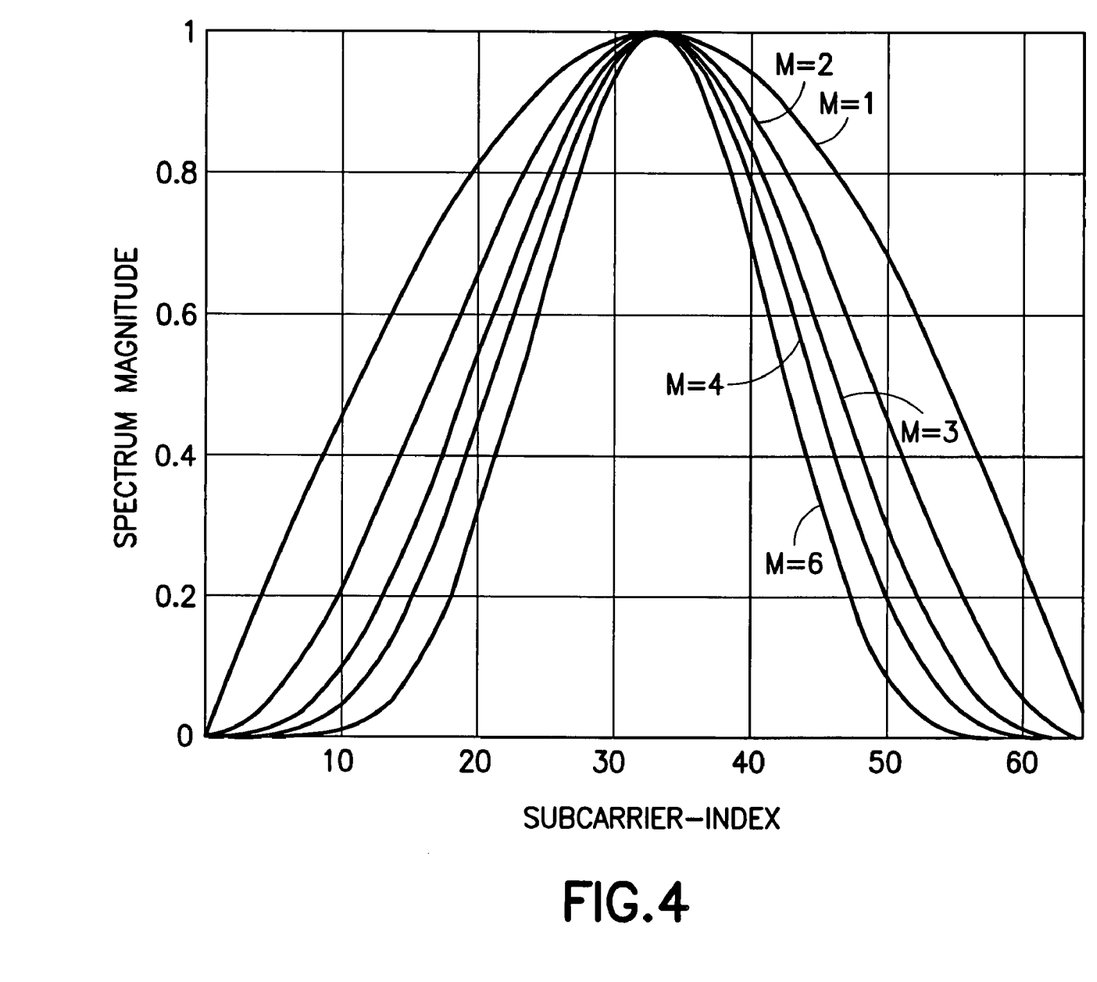
FIG. 4 shows a set of envelopes for different orders of partial response signaling.

A family of polynomials is obtained from the preceding equation, one polynomial for each value of M. The spectral envelope $e_N$ resulting from $c_N$ has a null at each of its extremities. As a consequence, the energy in the two extremes of the OFDM signal's baseband spectrum is effectively suppressed. FIG. 4 shows a set of sample envelopes obtained by using the family of polynomials above for different values of M.

From FIG. 4, it is clear that most of the energy in such a signal spectrum will be located in the center. This centralization of energy increases with the order, M of the PR signaling. In some cases, the performance loss incurred by dropping (i.e., not transmitting) subcarriers in the extremities of such a spectrum will be insignificant. Dropping the low-energy subcarriers however enables us to compress the signal in frequency and achieve significant bandwidth gains.

In FD-PR signalled OFDM therefore, we transmit only the (N-d) significant subcarriers out of the total N, dropping d/2 subcarriers from either end. We denote the transmitted signal (N-d subcarriers) as $x_{tx}$ and the residual (d subcarriers) that are dropped as $x_{rd}$. We define $\gamma(d)$ as the amplitude suppression factor due to the envelope $e_N$. With N-d subcarriers transmitted, we obtain the formula for $\gamma(d)$ shown in Equation 2 of FIG. 9.

Figure 9:
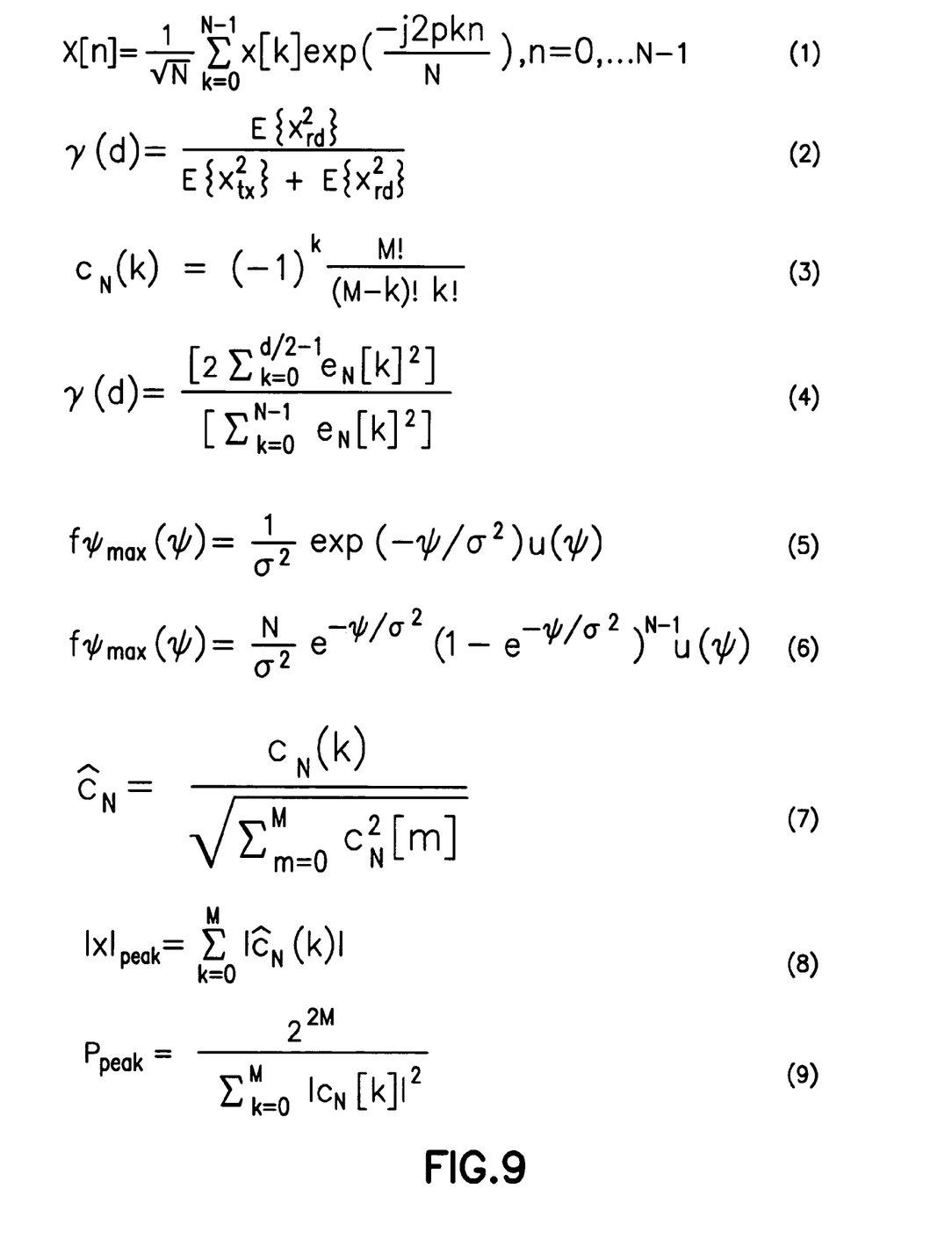
FIG. 9 shows equations used in calculations herein.

We note that the terms in the PR polynomial $c_N$ are obtained from the coefficients above as Eq. 3 in FIG. 9.

From Eq. 2 and Eq. 3, we can show that the amplitude suppression factor $\gamma(d)$ is given by Eq. 4 in FIG. 9.

Figure 5:
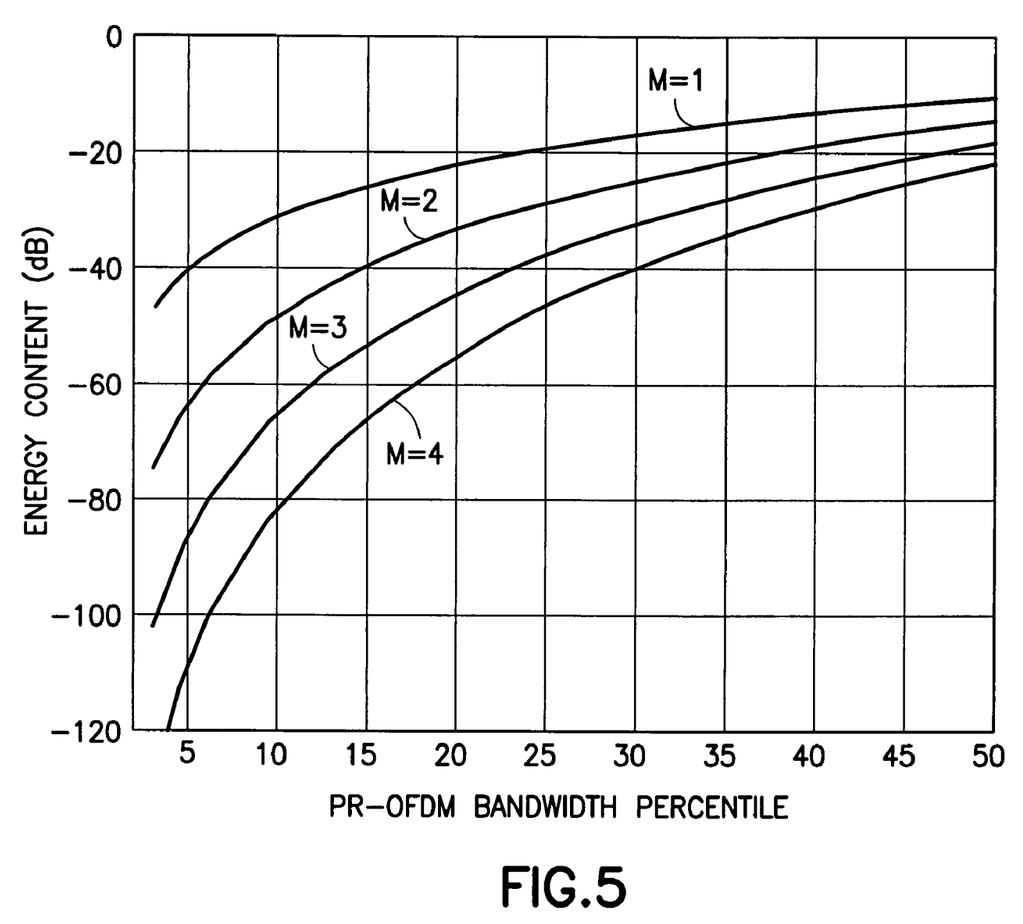
FIG. 5 shows the fractional energy in dB in the spectrum as a function of bandwidth percentile.

It can be seen that $\gamma(d)$ increases as we increase the length of $x_{rd}$ for a given M-value, and for a fixed value of d, it decreases as we increase the order M. The latter dependence on M can be inferred from the plots in FIG. 4. We plot $\gamma(d)$ as a function of the fractional bandwidth $\alpha=d/N$, taken up by the d subcarriers. d/N thus represents the potential spectral gain possible by dropping the residual subcarriers $X_{rd}$. This we note, can lead to spectral efficiency gain. In FIG. 5, on the y-axis we show fractional energy in dB (relative to total energy in the spectrum). It can readily be seen that over 25% of the FD-PR OFDM spectrum carries less than 1% of the signal energy. Moreover, the energy content declines rather steeply with PR order M. This energy profile is central to our ability to reduce the spectral footprint.

In the following material, we quantify the reduction in PAPR possible by using PR-OFDM. We note (from the Central Limit Theorem) that for a regular OFDM system, the signal components represented by $x_{Re}$ and $x_{Im}$ tend to be Gaussian $N(0,\sigma^2/2)$ for large FFT sizes. The instantaneous power $\sigma^2 = x_{Re}^2 + x_{Im}^2$, for a regular OFDM system can be shown to have an exponential PDF given by Eq. 5 in FIG. 9.

We also note that the sub-symbols x[k] are independent, since they are Gaussian as well as uncorrelated. It follows then that the envelope at different time-instants can be modeled as an ensemble of independent and identically distributed (i.i.d) random variables, each distributed as Eq. 5. Applying order statistics to this ensemble, the PDF of the peak power can be easily shown to be as shown in Eq. 6 in FIG. 9.

We can compute the first moment of $\psi_{max}$ using the PDF in Eq. 6, and show that the expected peak envelope power value strongly depends on N, the FFT size. In contrast, for a FD-PR signaled OFDM system, we have a very orderly time-domain signal to start with. This is after the swapping of FFT and IFFT signal spaces but before performing cyclic convolution. This signal ideally has a 0 dB PAPR. Let us say we use the polynomial $c_N$ as defined above to perform the PR signaling. The instantaneous energy in the envelope now fluctuates, albeit modestly. In practice, we wish to keep the energy in the constellation invariant, so we normalize $c_N$ to have unit norm, wherefrom we obtain $\hat{c}_N$ as shown in Eq. 7 in FIG. 9.

At this point, the PAPR can be predicted analytically for the FD-PROFDM system described in this paper. Let us assume for now that we perform PR signaling, but retain the full spectral constitution of the resulting signal (ie., no subcarrier dropping). The peak envelope amplitude for a QPSK system (which is what we consider here) can be shown by simple enumeration to be Eq. 8 in FIG. 9.

We take the summation over M+1 terms because the expression for the coefficients gives only (M+1) significant terms for $c_N$. From the above, the peak instantaneous power in the signal can be shown to be Eq. 9 in FIG. 9.

If we assume that the average energy transmitted per symbol is unity, we can conclude that Eq. 9 represents the PAPR encountered in a FDPR-OFDM system of order M.

Figure 6:
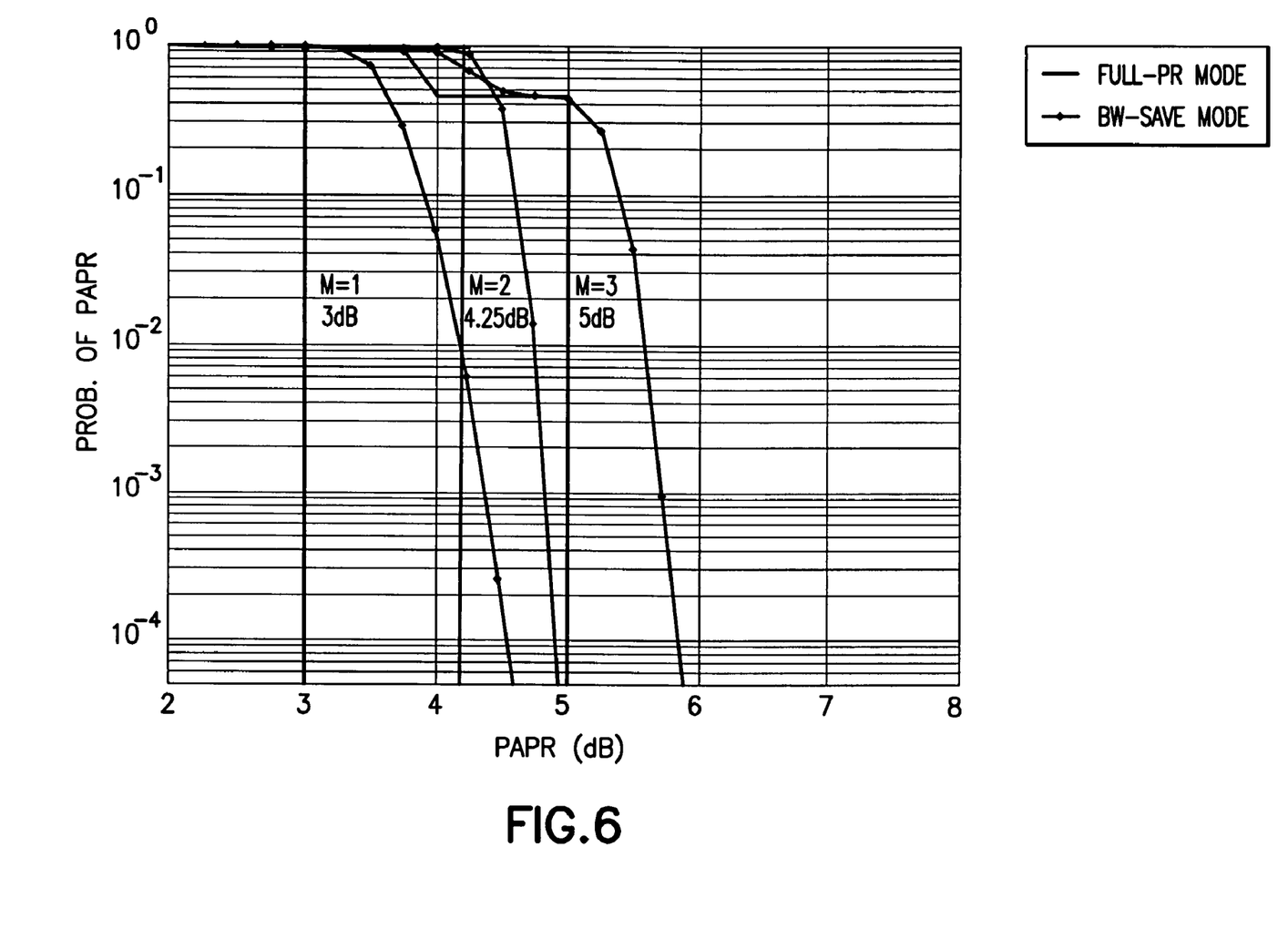
FIG. 6 shows the probability of exceeding various PAPR thresholds.

We now examine the PAPR results for FDPR-OFDM signals when simulated for different M-values. For each case, we estimated the probability of exceeding a certain PAPR threshold. The complementary CDF (CCDF) curves are shown in FIG. 6. The solid vertical lines denote upper-bounds for the PAPR when using PR-OFDM in the full-bandwidth mode (i.e, no bandwidth reduction through sub-carrier dropping, only PAPR gain). These bounds are derived from Eq. 9. Normal OFDM systems have a PAPR that is $10\log_{10}(N)$, which in practice is observable as 12–13 dB for N=64. Thus, the curves in FIG. 6 show PAPR improvements of 7–9 dB by employing frequency domain PR-OFDM. The curves with solid-dots are plots of PAPR when PR-OFDM according to the invention is used to conserve bandwidth too. When we drop d subcarriers in the bandwidth-save mode, we essentially slightly exceed the peak-bound of Eq. 9. However, we see in FIG. 6 that the net increase in PAPR is 1–1.5 dB only. Thus, even in bandwidth-save mode, we can achieve 6–7 dB of PAPR mitigation.

Figure 7:
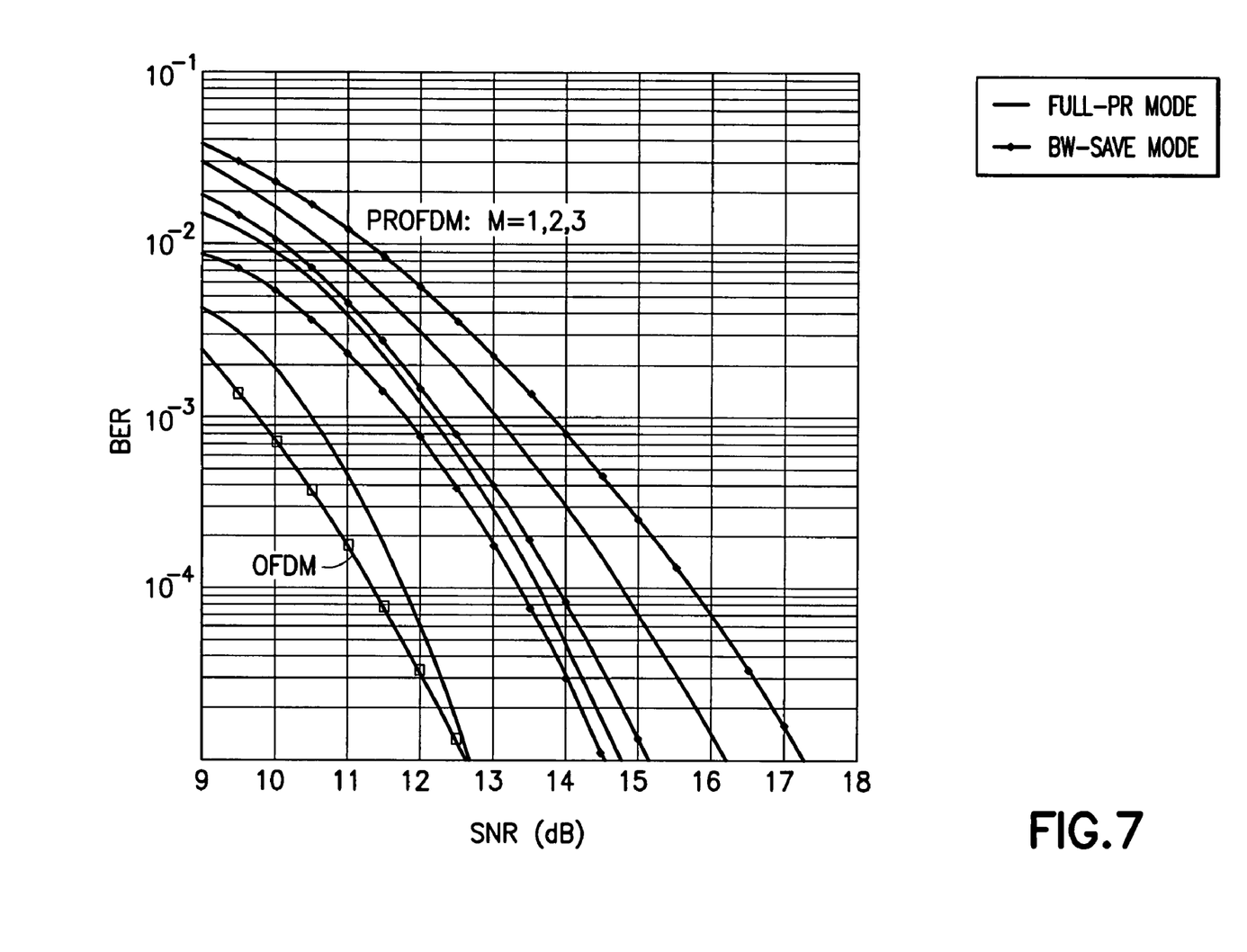
FIG. 7 shows the bit error rate as a function of SNR for full and restricted bandwidth in a system according to the invention.

We have also simulated in LOS channels a maximum likelihood receiver using the Viterbi algorithm for FDPR-OFDM signals with QPSK modulation. The BER obtained under strong line of sight (LOS) channel assumptions (i.e., AWGN environment) for PR orders, M=1, 2 and 3 are depicted in FIG. 7. The BER obtained in AWGN channels is being compared here with the BER of a normal-OFDM system. The solid curves represent PR-OFDM error-rates when no spectral gains are attempted (full-bandwidth mode). When we actually conserve bandwidth by dropping low-energy subcarriers, we refer to the lines with solid-dots. The curve with square marks is the reference curve for normal OFDM. While these results are only applicable in LOS channels, they are quite promising. For an aggregate BER of $5\times10^4$ we stand to lose 1–3 dB of SNR, i.e. the SNR increases in order to maintain the BER. The greater loss at higher orders of M is easily justified due to the decreasing eye-opening in the ML detector. Interestingly, the additional loss in SNR when using bandwidth-save mode varies non-uniformly with M. The maximum loss is with M=1, at slightly under 1.5 dB. M=3 has 0.75 dB loss, while M=2 has only about 0.25 dB to lose. In this case, even-order PR signaling is preferred to odd-order.

Figure 8:
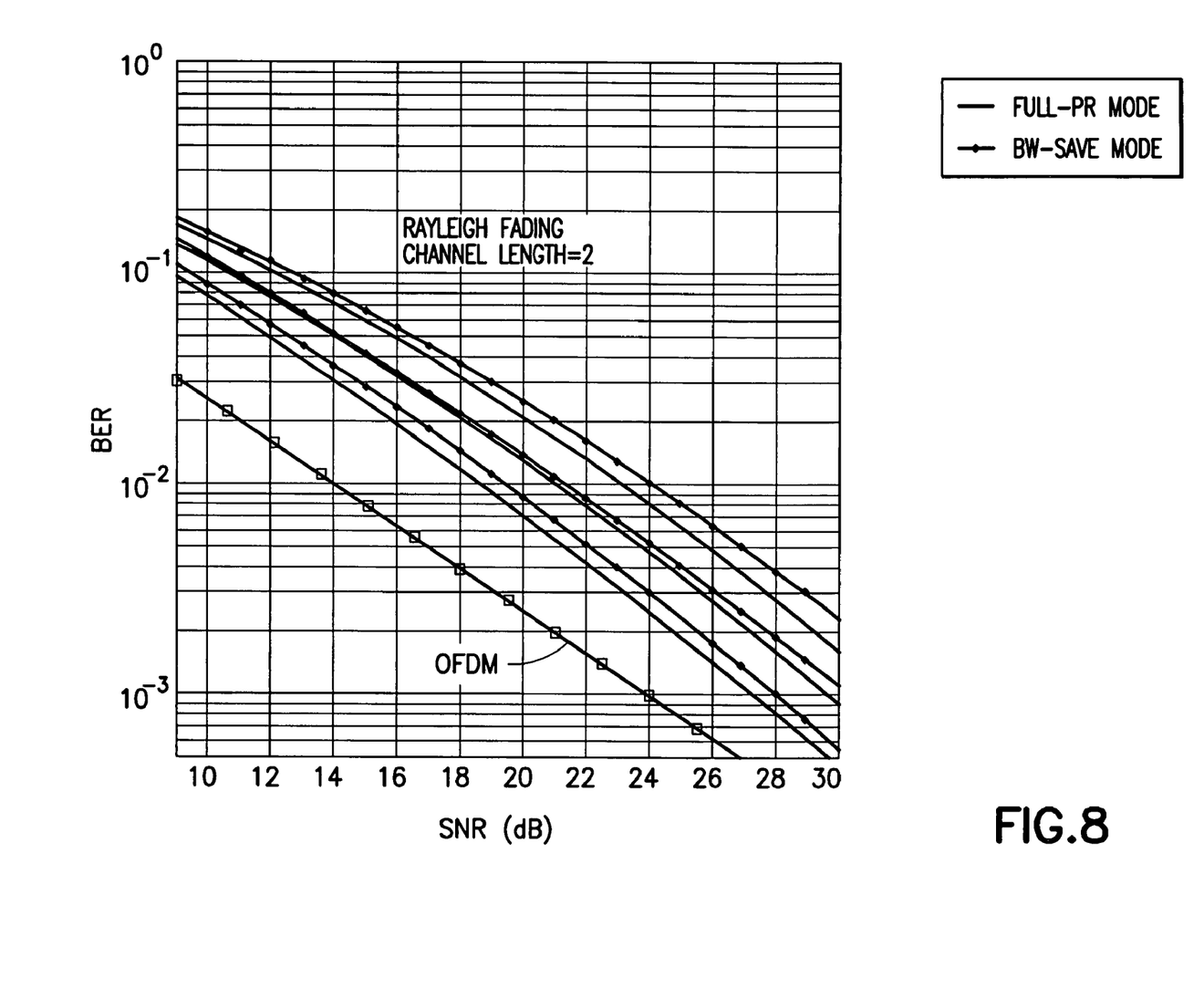
FIG. 8 shows the bit error rate as a function of SNR for different PR orders.

Finally, we generated BER using Monte Carlo simulations with frequency selectivity. We assumed Rayleigh-fading channels of length=2 and 5. The channel was compensated in our case with a zero-forcing equalizer (ZFE) in the frequency domain. Although a ZFE is inferior to choices like MMSE or DFE, it keeps the equalizer simple, and serves as a reference to compare with other systems. For a target BER of $3\times10^{-3}$ we need about 23 dB SNR with the lowest order PR signals. The SNR penalty paid increases in steps of 3 dB, 2.5 dB and 2 dB respectively as we progress from normal OFDM to M=1, 2 & 3. Notably, the operating SNR for a given BER changes only marginally when we invoke the bandwidth save mode. It seems logical to use FD-PR signaling in bandwidth save mode, whenever possible, in fading channels. The BER versus SNR curves for a 5-tap channel are plotted in FIG. 8. The trends look similar to a 2-tap channel, except we lose 1–2 dB more in SNR. Notably, for M=2, the full-PR mode and bandwidth-save mode almost overlap, which agrees with a trend in AWGN channels.

An alternative embodiment of FD-PR signaling that uses phase-modulated constant envelope amplifiers takes advantage of the fact that the time domain signal is composed of a finite set of amplitude levels. In that case, the focus in the RFPA design then shifts from one of maintaining linearity to one of maintaining phase balance. Benefits of this approach include significant efficiency in the transmitter. On the receiver side, considerable benefits result from simplifying the effective (channel plus PR polynomial) memory needed for good performance. This simplicity also reduces system complexity as it reduces the number of states in the Viterbi trellis used for sequence detection.

Those skilled in the art will appreciate that a convenient way to implement this invention is to embed the algorithm as software on a DSP processor core used for an OFDM system. The software changes to modify existing systems would be made at the modulation end (in order to perform cyclic convolution) and at the detector end (in order to perform maximum-likelihood sequence detection). An alternative implementation of this invention is a hardware accelerator that would perform joint equalization and detection at the receiver. Advantageously, the cyclic convolution part at the modulator end is of fairly low DSP-complexity.

Some of the abbreviations used in this invention are:
OFDM: Orthogonal frequency division multiplexing
PR: partial response
PAPR: Peak to average power ratio
ML: Maximum Likelihood
FD-PR: Frequency domain partial response
BER: Bit error rate
SNR: Signal to noise ratio
DSP: Digital signal processing
BPSK: Binary phase shift keying
QPSK: Quadrature phase shift keying The frequency selective BER simulations were performed with simple ZFE equalizer structures for convenience in calculating. Further SNR improvement can be achieved by using MMSE or MMSE-DFE equalizers. Among other possibilities, MMSE-DFE equalizers provide a way for combined optimization of the channel impulse response and the partial response polynomial. The main drawback of an FD-PR system is that the detector can be somewhat complex. Some of this detector complexity would be well justified however if we can reuse the soft-information from it for joint coding and modulation.

Although described in the context of particular embodiments, it will be apparent to those skilled in the art that a number of modifications to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above and claimed hereafter.

I claim:

1. A communication system comprising:
   a transmitter for generating a signal, wherein the signal is generated from a partial response signal produced from mapping an input bit stream to a complex number domain and wherein the transmitter transforms a stream of symbols in a time domain to a set of frequency domain subcarriers and suppresses a plurality of subcarriers having power less than a threshold amount; and
   a receiver in communication with the transmitter through a channel for receiving a signal, wherein the receiver recovers the received signal by a sequence-detection mechanism in the time domain.

2. A communication system comprising:
   a transmitter for generating a signal, wherein the signal is generated from a partial response signal produced from mapping an input bit stream to a complex number domain and wherein the transmitter transforms a stream of symbols in a time domain to a set of frequency domain subcarriers and suppresses a plurality of subcarriers having power less than a threshold amount; and
   a receiver in communication with the transmitter through a channel for receiving a signal, wherein the receiver recovers the received signal by a sequence-detection mechanism in the time domain wherein the transmitter comprises:
   a mapping unit for mapping the input bit stream in the time domain to a set of sub-symbols;
   a cyclic convolver unit coupled to the mapping unit for generating the partial response signal;
   a unit for transforming the stream of symbols to said set of frequency domain subcarriers;
   a spectral compression unit for deleting selected subcarriers; and
   an inverse transforming unit for transforming the set of frequency domain subcarriers to the time domain.

3. The system of claim 2, in which said spectral compression unit deletes an equal number of subcarriers at least one extremity of the set of frequency domain subcarriers.

4. The system of claim 3, in which said spectral compression unit deletes subcarriers carrying energy less than a threshold at the extremities of the set of frequency domain subcarriers.

5. A communication system comprising:
a transmitter for generating a signal, wherein the signal is generated from a partial response signal produced from mapping an input bit stream to a complex number domain and wherein the transmitter transforms a stream of symbols in a time domain to a set of frequency domain subcarriers and suppresses a plurality of sub-carriers having power less than a threshold amount; and
a receiver in communication with the transmitter through a channel for receiving a signal, wherein the receiver recovers the signal by a sequence-detection mechanism in the time domain in which a spectral compression unit deletes an equal number of subcarriers at the extremities of the set of frequency domain subcarriers.

6. The system of claim 5, in which said spectral compression unit deletes subcarriers carrying energy less than a threshold at the extremities of the set of frequency domain subcarriers.

7. A communication system comprising:
a transmitter for generating a signal, wherein the signal is generated from a partial response signal produced from mapping an input bit stream to a complex number domain and wherein the transmitter transforms a stream of symbols in a time domain to a set of frequency domain subcarriers and suppresses a plurality of sub-carriers having power less than a threshold amount; and
a receiver in communication with the transmitter through a channel for receiving a signal, wherein the receiver recovers the received signal by a sequence-detection mechanism in the time domain in which said transmitter comprises at least one phase-modulated constant envelope amplifier.

8. The system of claim 7, wherein the transmitter comprises:
a mapping unit for mapping the input bit stream in the time domain to a set of sub-symbols;
a cyclic convolver unit coupled to the mapping unit for generating a the partial response signal;
a unit for transforming the stream of symbols to said set of frequency domain subcarriers; and
a spectral compression unit for deleting selected subcarriers; and an inverse transforming unit for transforming the set of frequency domain subcarriers to the time domain.

9. The system of claim 8, in which said spectral compression unit deletes an equal number of subcarriers at the extremities of the set of frequency domain subcarriers.

10. The system of claim 9, in which said spectral compression unit deletes subcarriers carrying energy less than a threshold at the extremities of the set of frequency domain subcarriers.

11. The system of claim 7, in which a spectral compression unit deletes an equal number of subcarriers at the extremities of the set of frequency domain subcarriers.

12. The system of claim 11, in which said spectral compression unit deletes subcarriers carrying energy less than a threshold at the extremities of the set of frequency domain subcarriers.

13. A mobile station comprising:
a transmitter means for generating and sending a signal to a remote receiver, wherein the signal is generated from a partial response signal produced from mapping an input bit stream to a complex number domain and wherein the transmitter transforms a stream of symbols in a time domain to a set of frequency domain subcarriers and suppresses a plurality of sub-carriers having power less than a threshold amount; and
a receiver for receiving a signal from a remote transmitter through a channel, wherein the receiver recovers the received signal by a sequence-detection mechanism in the time domain.

14. The mobile station of claim 13, wherein the transmitter comprises:
a mapping unit for mapping the input bit stream in the time domain to a set of sub-symbols;
a cyclic convolver unit coupled to the mapping unit for generating the partial response signal;
a unit for transforming the stream of symbols to said set of frequency domain subcarriers;
a spectral compression unit for deleting selected subcarriers; and
an inverse transforming unit for transforming the set of frequency domain subcarriers to the time domain.

15. The mobile station of claim 14, in which said spectral compression unit deletes an equal number of subcarriers at the extremities of the set of frequency domain subcarriers.

16. The mobile station of claim 15, in which said spectral compression unit deletes subcarriers carrying energy less than a threshold at the extremities of the set of frequency domain subcarriers.

17. The mobile station of claim 13, in which a spectral compression unit deletes an equal number of subcarriers at the extremities of the set of frequency domain subcarriers.

18. A method for increasing bit-rate through effective bandwidth gain in a system utilizing an orthogonal frequency division multiplexing technique, the method comprising:
selecting a cyclic convolver having predefined values;
applying the cyclic convolver to a time-domain signal having a plurality of sub-symbols to produce a partial response signal having the plurality of sub-symbols, wherein the values of the cyclic convolver are selected such that a portion of a Fourier transform of the plurality of sub-symbols of the partial response signal is reduced to near zero amplitude;
dropping the portion of the Fourier transform of the plurality of sub-symbols with near zero amplitude from the partial response signal to produce a truncated partial response signal; and
appending a cyclic prefix at a leading edge of the truncated partial response signal.

19. The method of claim 18, further comprising:
transforming the partial response signal using a fourier transformation technique to produce a signal in a frequency domain;
transmitting the frequency domain signal through a noisy channel to produce a noisy signal;
and recovering a time based signal from the noisy signal at a receiver.

* * * * *

UNITED STATES PATENT AND TRADEMARK OFFICE
CERTIFICATE OF CORRECTION

| | | |
|---|---|---|
| PATENT NO. | : 7,173,961 B2 | Page 1 of 1 |
| APPLICATION NO. | : 10/793017 | |
| DATED | : February 6, 2007 | |
| INVENTOR(S) | : Vadde | |

It is certified that error appears in the above-identified patent and that said Letters Patent is hereby corrected as shown below:

Claim 8, Column 15, line 43, delete "a".

Claim 13, Column 16, line 2, delete "means".

Signed and Sealed this

Twenty-second Day of May, 2007

JON W. DUDAS
*Director of the United States Patent and Trademark Office*